(12) United States Patent  
Kuppan et al.

(10) Patent No.: US 11,592,026 B2  
(45) Date of Patent: Feb. 28, 2023

(54) FAN ASPIRATOR

(71) Applicant: GOODRICH CORPORATION, Charlotte, NC (US)

(72) Inventors: Skandan Berikai Kuppan, Bangalore (IN); Jeffrey Martin Werbelow, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 16 days.

(21) Appl. No.: 17/237,304

(22) Filed: Apr. 22, 2021

(65) Prior Publication Data

US 2022/0196022 A1 Jun. 23, 2022

(30) Foreign Application Priority Data

Dec. 22, 2020 (IN) .............................. 202041055872

(51) Int. Cl.
| | |
|---|---|
| *F04D 25/06* | (2006.01) |
| *B64D 25/14* | (2006.01) |
| *F04D 19/00* | (2006.01) |
| *F04D 25/02* | (2006.01) |
| *F04D 25/08* | (2006.01) |

(52) U.S. Cl.
CPC ............ *F04D 25/06* (2013.01); *B64D 25/14* (2013.01); *F04D 19/002* (2013.01); *F04D 25/02* (2013.01); *F04D 25/08* (2013.01)

(58) Field of Classification Search
CPC ...... F04D 19/002; F04D 25/12; F04D 25/163; F04D 25/028; F04D 25/06–0693; F04D 25/08–14; F04D 3/00–005; F04D 29/002; F04D 29/181; F04D 29/602; F04D 29/00; F04D 25/00; F04D 25/02; F04D 13/028; Y02T 50/60; F02K 5/00
USPC ............................................ 417/423.1–423.2
See application file for complete search history.

(56) References Cited

U.S. PATENT DOCUMENTS

| | | | | |
|---|---|---|---|---|
| 2,441,446 | A | * | 5/1948 | Schmitter ............... F04D 25/02 74/411 |
| 2,470,794 | A | * | 5/1949 | Snyder ..................... F04D 3/00 417/384 |
| 3,001,692 | A | * | 9/1961 | Schierl .................. F04D 25/163 415/199.1 |
| 3,399,407 | A | * | 9/1968 | Olsen ....................... A63B 6/02 182/139 |
| 6,591,873 | B1 | | 7/2003 | McNeil |
| 9,637,210 | B2 | | 5/2017 | Thomson |
| 2006/0172686 | A1 | * | 8/2006 | Ho ......................... F04D 25/02 454/228 |

(Continued)

FOREIGN PATENT DOCUMENTS

EP 3708488 9/2020

OTHER PUBLICATIONS

European Patent Office; European Search Report dated May 13, 2022 in Application No. 21216584.9.

*Primary Examiner* — Thomas Fink  
(74) *Attorney, Agent, or Firm* — Snell & Wilmer L.L.P.

(57) ABSTRACT

A fan aspirator, and related systems and methods, utilizes a plurality of motors to drive a fan of an aspirator to deliver inflation fluid to an inflatable device. The fan aspirator includes a plurality of motors and a respective plurality of drive gears configured to drive a pinion gear to which the fan is mounted within a central chamber of the housing of fan aspirator.

20 Claims, 5 Drawing Sheets

(56) References Cited

U.S. PATENT DOCUMENTS

| | | | | |
|---|---|---|---|---|
| 2007/0134111 | A1* | 6/2007 | Eybergen | F04D 25/028 |
| | | | | 417/423.6 |
| 2009/0004003 | A1 | 1/2009 | Haslao et al. | |
| 2009/0175745 | A1* | 7/2009 | Usami | F04D 25/166 |
| | | | | 415/228 |
| 2014/0186197 | A1* | 7/2014 | Owusu | F04D 25/0693 |
| | | | | 417/326 |
| 2014/0219775 | A1* | 8/2014 | Shin | F04D 25/163 |
| | | | | 415/60 |
| 2015/0219398 | A1* | 8/2015 | Santoro | F04D 19/007 |
| | | | | 62/314 |
| 2016/0245293 | A1* | 8/2016 | Alvini | F04D 25/08 |
| 2018/0058463 | A1* | 3/2018 | Rollins | F04D 29/059 |
| 2018/0283389 | A1* | 10/2018 | Fujioka | F04D 29/056 |
| 2019/0063444 | A1* | 2/2019 | Yeh | F04D 25/0606 |
| 2019/0393763 | A1* | 12/2019 | Menheere | F04D 19/024 |

* cited by examiner

FAN ASPIRATOR

CROSS-REFERENCE TO RELATED APPLICATIONS

This application claims priority to and the benefit of Indian Patent Application No. 202041055872 filed Dec. 22, 2020 entitled "FAN ASPIRATOR," which is incorporated herein by reference in its entirety for all purposes.

FIELD

The present disclosure is directed to aircraft evacuation systems, and more particularly to a fan aspirator for inflating flotation devices and inflation assemblies for evacuation systems.

BACKGROUND

Conventional evacuation systems of aircraft generally include an inflatable device, such as an evacuation slide, an aspirator for inflating the inflatable device, and a source of compressed gas (e.g., one or more tank of compressed gas). In response to the evacuation system becoming deployed, the source of compressed gas may release gas through the aspirator, which then also draws air from the environment of the aspirator and inflates the inflatable device using the decompressed gas and the air. However, use of compressed gas storage tanks may be undesirable for various reasons. For example, the storage tanks may undesirably increase a total weight of the aircraft. Additionally, the storage tanks may be difficult to store and transport on board the aircraft.

SUMMARY

In various embodiments, the present disclosure provides a fan aspirator that includes a housing, a fan, a pinion gear, and at least one motor. The housing defines a central channel and has a central longitudinal axis, according to various embodiments. The fan is disposed in the central channel and is configured to rotate about a rotational axis that is substantially parallel to the central longitudinal axis, according to various embodiments. The pinion gear may be coupled to the fan and may be configured to rotate with the fan, with the pinion gear comprising an annular body with a gear track. The at least one motor comprises a drive gear, with the motor being coupled to the housing and the drive gear being mechanically coupled to the gear track of the annular body of the pinion gear, wherein the fan is configured to be driven via the drive gear and the pinion gear.

In various embodiments, the motor is a first motor of a plurality of motors having a respective plurality of drive gears. The plurality of motors may be coupled to the housing and may be distributed circumferentially around the rotational axis such that each drive gear of the respective plurality of drive gears is mechanically coupled to the gear track of the annular body of the pinion gear. In various embodiments, the plurality of motors comprises at least 4 motors. In various embodiments, the plurality of motors comprises at least 6 motors.

In various embodiments, the gear track is disposed on a radially outward surface of the annular body of the pinion gear such that the plurality of motors are circumferentially distributed around a periphery of the pinion gear. In various embodiments, a radially inward surface of the annular body of the pinion gear is radially outward of tips of fan blades of the fan such that a radial gap is defined between the tips of the fan blades and the radially inward surface of the annular body of the pinion gear. In various embodiments, a radially inward surface of the central channel of the housing at an axial location of fan blades of the fan is radially outward of tips of the fan blades such that a radial gap is defined between the tips of the fan blades and the radially inward surface of the central channel of the housing at the axial location of the fan blades. In various embodiments, a radially inward surface of the annular body of the pinion gear is radially outward of a radially inward surface of the central channel of the housing at an axial location of the pinion gear.

The fan aspirator may further include a controller electrically coupled to the plurality of motors. The controller may be configured to synchronize angular speed of the plurality of motors. In various embodiments, a gear ratio of the fan aspirator is between 1.25 and 6. In various embodiments, a gear ratio of the fan aspirator is between 1.5 and 3. In various embodiments, a gear ratio of the fan aspirator is about 1.67.

Also disclosed herein, according to various embodiments, is a system for inflating an inflatable device. The system may include an inflatable device and a fan aspirator. The fan aspirator may be coupled to the inflatable device, and may include a housing, a fan, a pinion gear, and a plurality of motors. The housing may define a central channel and may have a central longitudinal axis. The fan may be disposed in the central channel and may be configured to rotate about a rotational axis that is substantially parallel to the central longitudinal axis. The pinion gear, according to various embodiments, is coupled to the fan and configured to rotate with the fan, with the pinion gear comprising an annular body comprising a gear track. The plurality of motors may include a respective plurality of drive gears. The plurality of motors are coupled to the housing and are distributed circumferentially around the rotational axis such that each drive gear of the respective plurality of drive gears is mechanically coupled to the gear track of the annular body of the pinion gear, according to various embodiments.

In various embodiments, the system also includes an electrical power source electrically coupled to the motor. In various embodiments, the system further includes a controller electrically coupled to the plurality of motors and configured to synchronize angular speed of the plurality of motors. The plurality of motors may include at least 4 motors, and the gear ratio of the driven pinion gear to the drive gears may be between 1.5 and 3.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
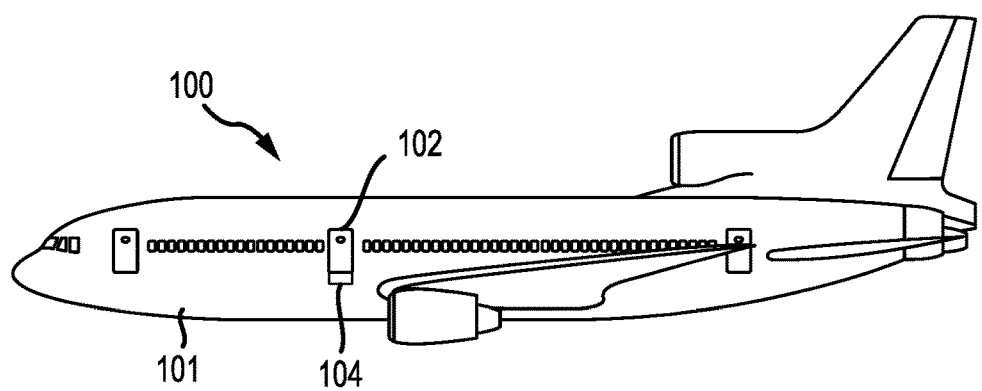
FIG. 1 is a drawing of an aircraft having an exit door and an evacuation system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a fan aspirator, and related systems and methods, which utilizes one or more motors to drive a fan of the aspirator to deliver inflation fluid to an inflatable device. Generally, the fan aspirator includes a plurality of motors and a respective plurality of drive gears configured to drive a pinion gear coupled to a fan disposed within the housing of the fan aspirator. Although numerous details and examples are included herein pertaining to utilizing these concepts in conjunction with inflatable devices of aircraft evacuation systems, the present disclosure is not necessarily so limited, and thus aspects of the disclosed embodiments may be adapted for performance in a variety of other industries. As such, numerous applications of the present disclosure may be realized.

Referring now to FIG. 1, an aircraft 100 is shown. The aircraft 100 may include a fuselage 101 having a plurality of exit doors including an exit door 102. The aircraft 100 may include one or more evacuation systems positioned near a corresponding exit door or located anywhere in or on the fuselage 101. For example, the aircraft 100 includes an evacuation system 104 positioned near the exit door 102, and may include another evacuation system positioned in the fuselage 101 and designed to inflate outside of the fuselage to provide at least one of egress or flotation. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
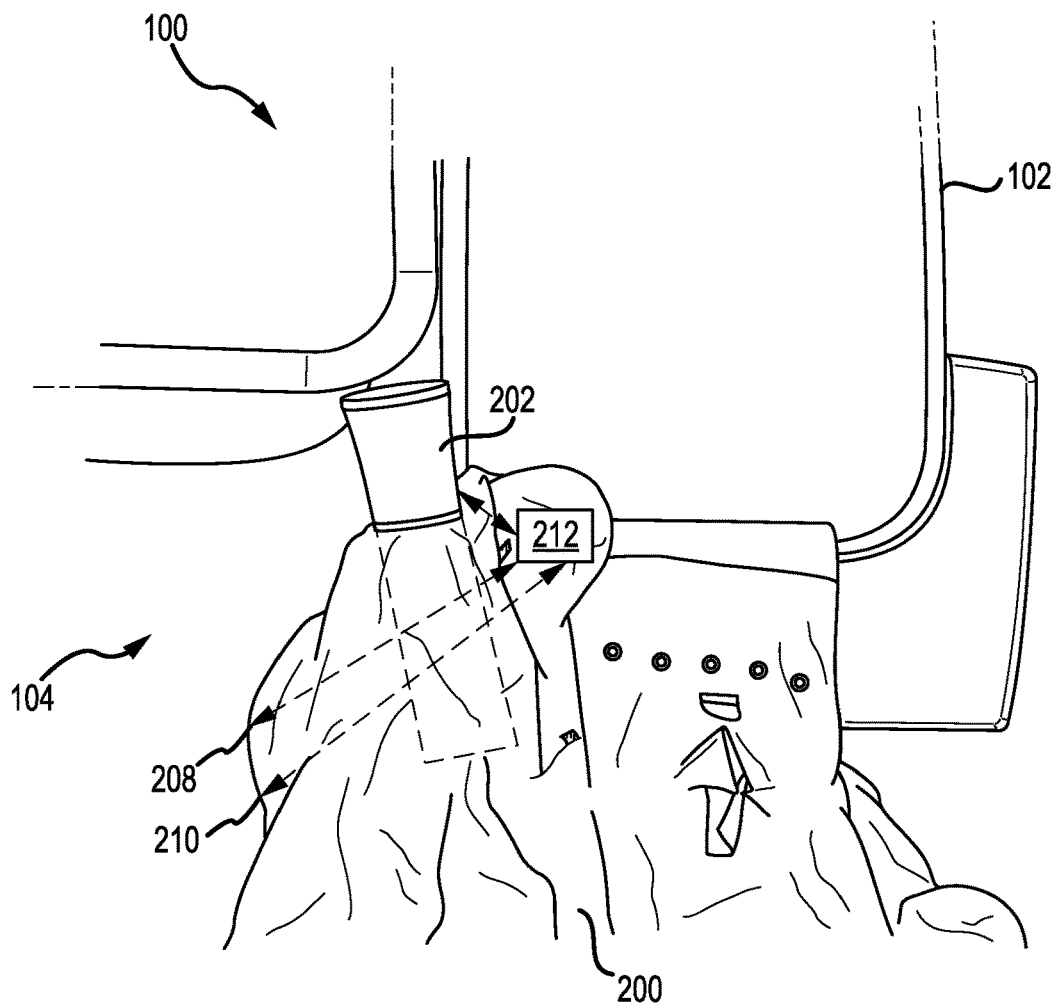
FIG. 2 is a perspective view of an evacuation system in a partially deployed configuration, in accordance with various embodiments.

Turning to FIG. 2, additional details of the evacuation system 104 are illustrated. In particular, the evacuation system 104 includes an inflatable device 200. The evacuation system 104 further includes a fan aspirator 202, a controller 208, a pressure sensor 210, and a power source 212. The inflatable device 200 may be coupled to the fuselage 101 of FIG. 1, and may be decoupled from the fuselage 101 in response to being fully inflated or to being manually detached in order to allow passengers and/or crew members to safely float away from the aircraft 100 of FIG. 1. In various embodiments, the inflatable device 200 may be permanently coupled to the fuselage 101. In various embodiments, the inflatable device 200 may function as a slide from the fuselage 101 to a ground surface upon which the aircraft 100 is resting. In various embodiments, the inflatable device 200 may be entirely decoupled from the fuselage 101 at all times, may be removed from a cabin by a passenger or crew member, and may be inflated away from the fuselage.

Details regarding the fan aspirator 202 (which may be a ducted fan aspirator) will be discussed in more detail below. The controller 208 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The pressure sensor 210 may include any sensor capable of detecting data corresponding to a pressure within the inflatable device 200 (the air within the inflatable device 200 may be referred to as "device air"). The controller 208 may be coupled to the fan aspirator 202 and may control the aspirator 202. In various embodiments, the controller 208 may further be coupled to the pressure sensor 210, may determine the pressure within the inflatable device 200 based on the detected pressure data, and may control the fan aspirator 202 based on the determined pressure. The power source 212 may include any power storage device such as one or more of a battery (e.g., a lithium polymer battery), a flywheel, or a capacitor. In various embodiments, the power source 212 may include any power generation device such as a generator. The power source 212 may provide electrical energy to the motor(s) of the fan aspirator 202, the controller 208, and/or the pressure sensor 210 to facilitate operation of these elements. In various embodiments, fan aspirator may be coupled to an electrical power line to receive electrical energy.

Figure 3A:
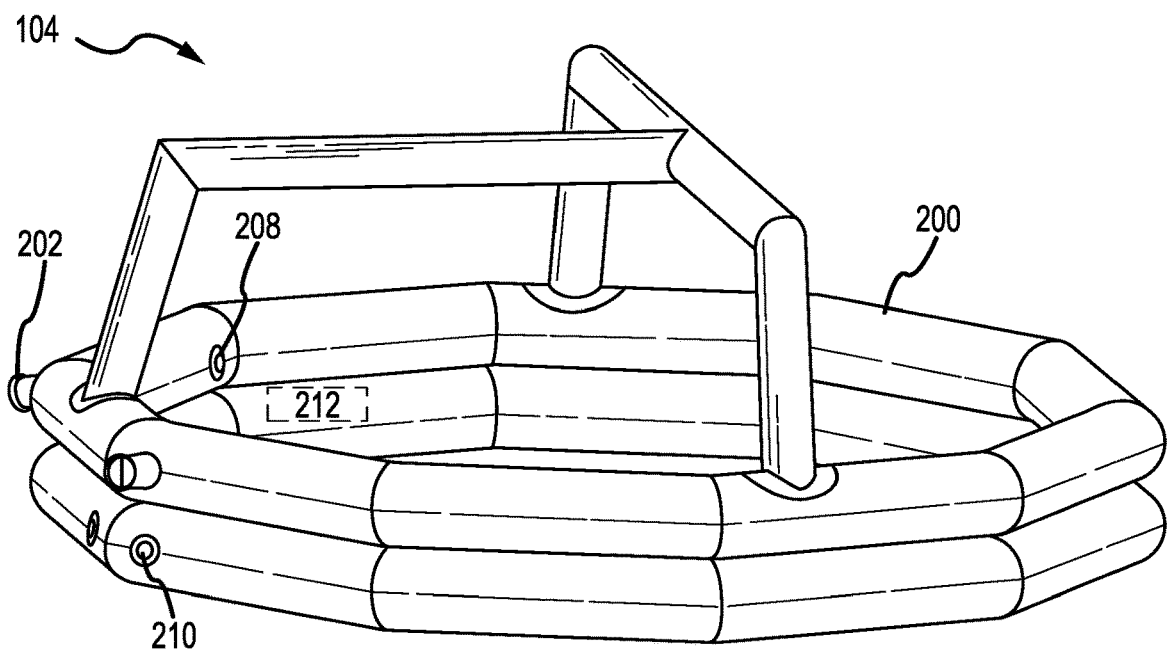
FIG. 3A is a perspective view of an inflatable device in an inflated configuration, in accordance with various embodiments.

Referring to FIG. 3A, the inflatable device 200 is illustrated as fully inflated and separated from the fuselage 101 of FIG. 1. In particular, the fan aspirators 202, the controller 208, the pressure sensor 210, and the power source 212 may remain coupled to the inflatable device 200. In various embodiments, one or more of these elements of the evacuation system 104 may become detached from the inflatable device 200 before, during, or after inflation.

Figure 3B:
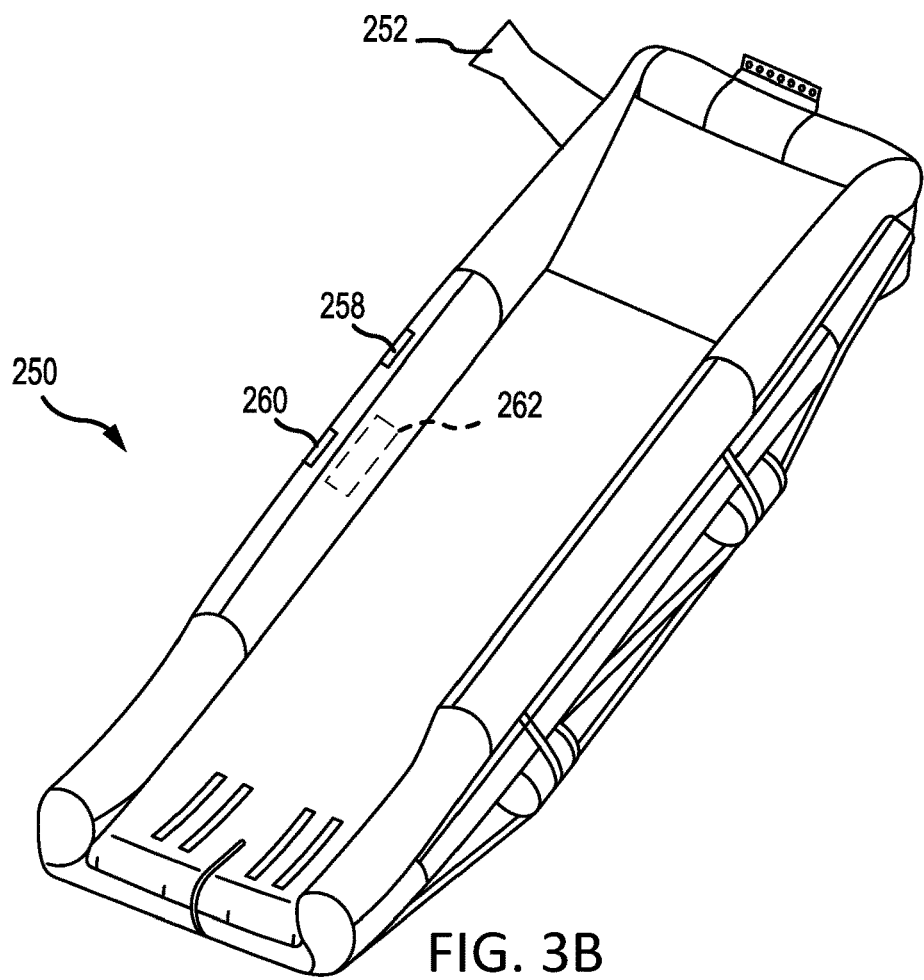
FIG. 3B is a perspective view of another inflatable device in an inflated configuration, in accordance with various embodiments.

Referring briefly to FIG. 3B, another inflatable device 250 is shown as inflated. The inflatable device 250 may provide egress from an aircraft in various situations. In various embodiments, the inflatable device 250 may include similar features as the inflatable device 200 of FIG. 3A. In that regard, the inflatable device 250 may include a fan aspirator 252. The inflatable device 250 may further include a controller 258, a pressure sensor 260, and a power source 262. The inflatable device 250 may be coupled to a fuselage of an aircraft, and may be decoupled from the fuselage in response to being fully inflated or to being manually detached in order to allow passengers and/or crew members to safely float away from the aircraft. In various embodiments, the inflatable device 250 may be permanently coupled to the fuselage. In various embodiments, the inflatable device 250 may function as a slide from the fuselage to a ground surface upon which the aircraft is resting.

Figure 4A:
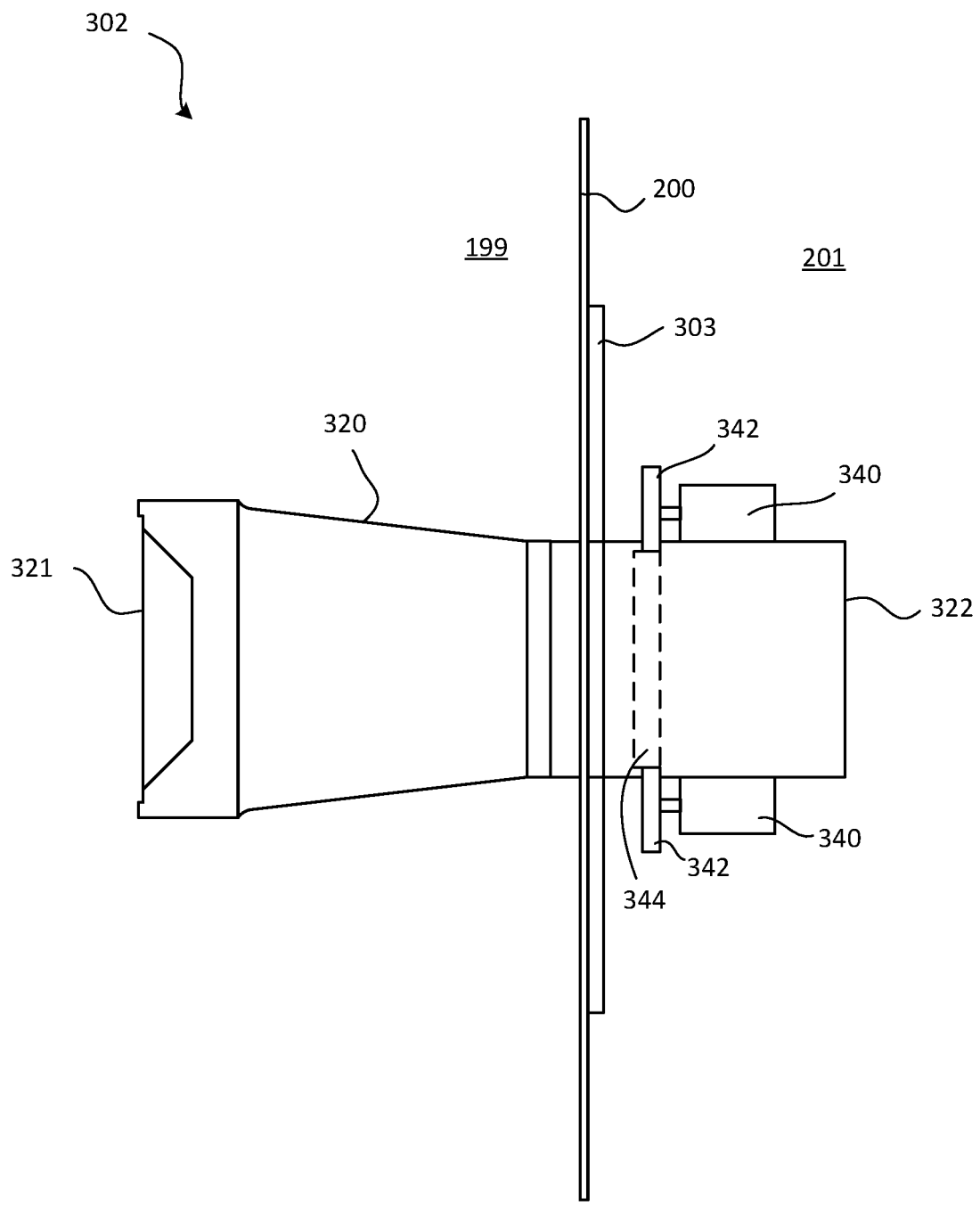
FIG. 4A is a schematic side view of a fan aspirator coupled to an inflatable device, in accordance with various embodiments.
Figure 4B:
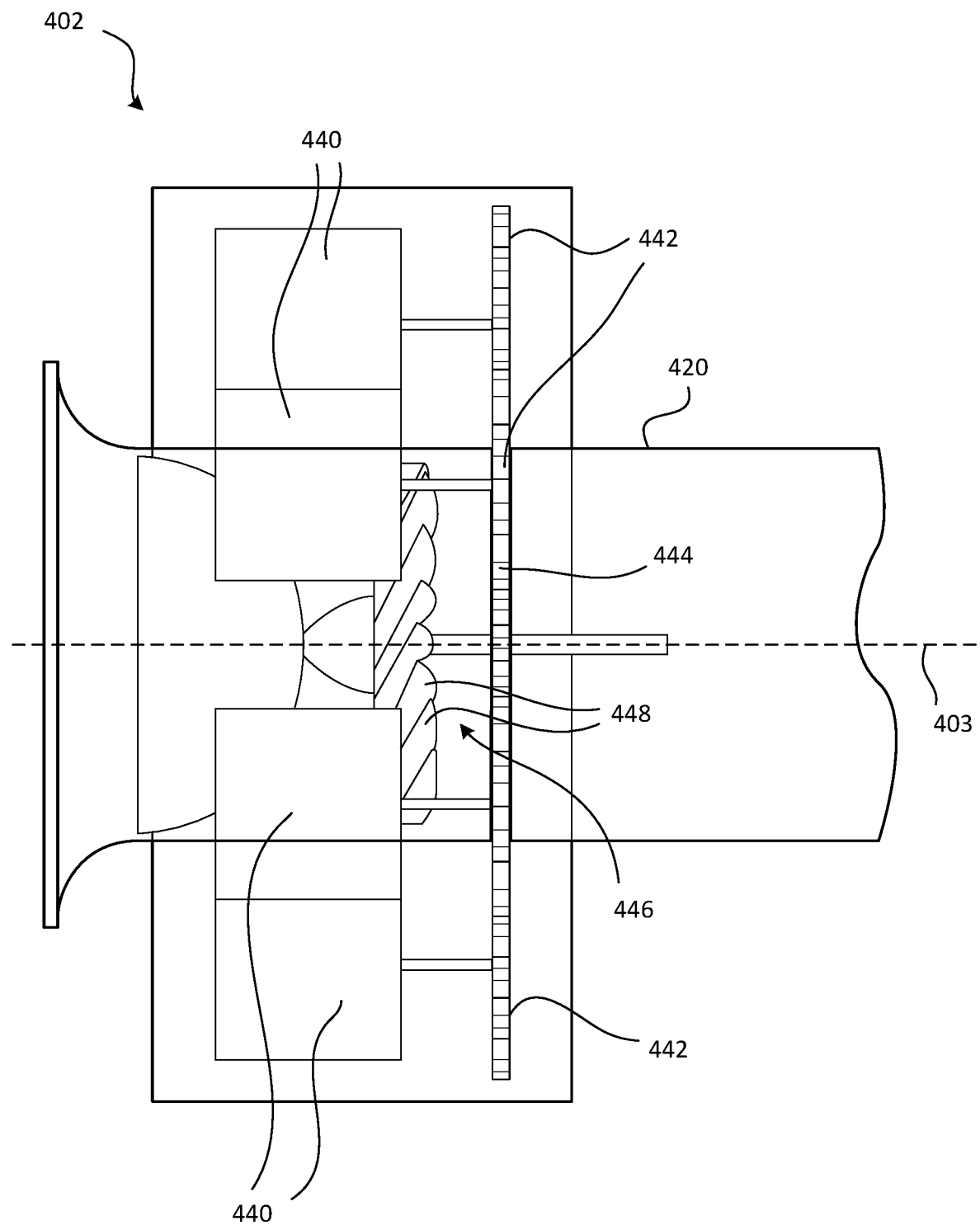
FIG. 4B is a side cutaway view of a fan aspirator having a plurality of motors and a respective plurality of drive gears, in accordance with various embodiments.
Figure 4C:
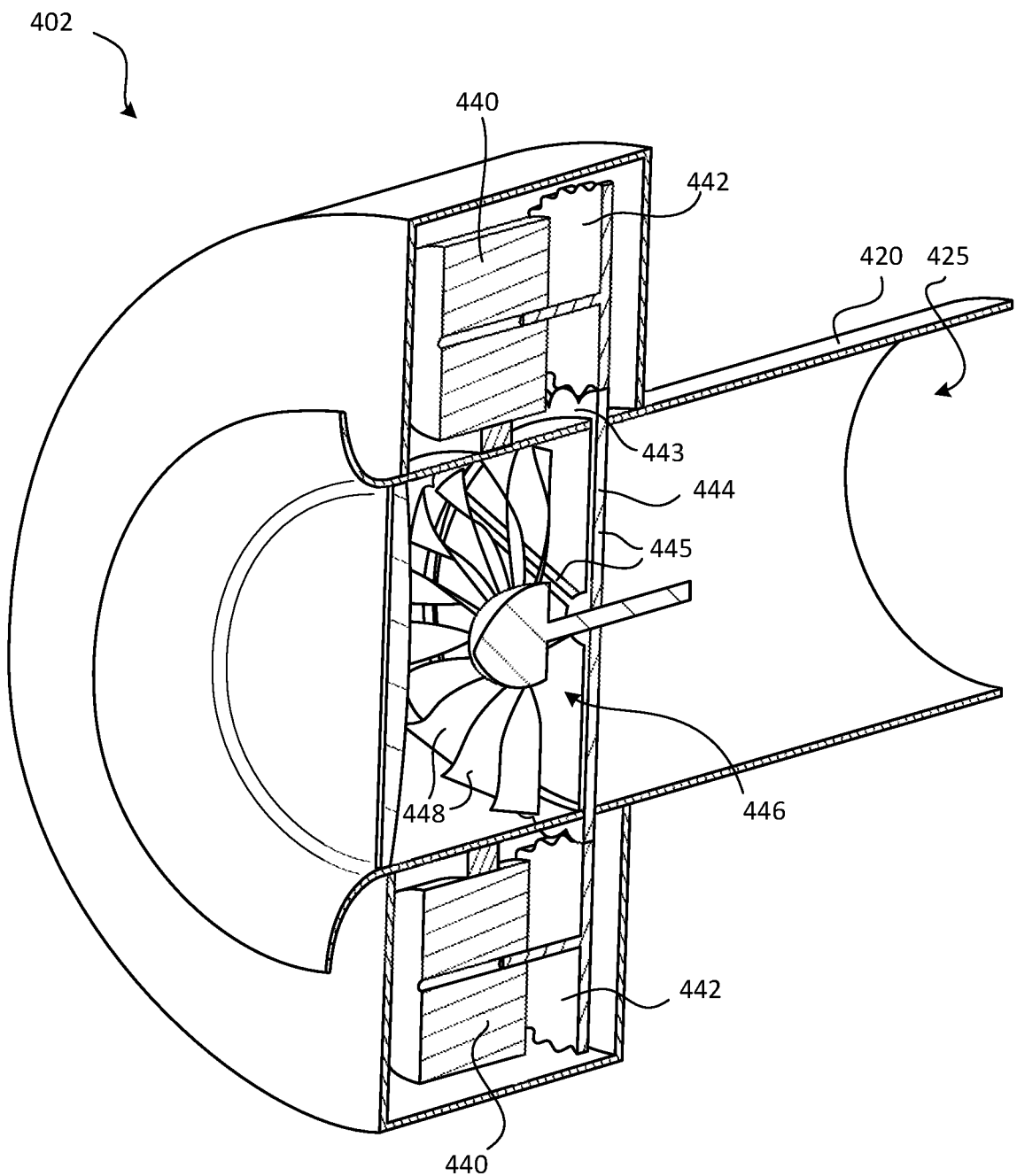
FIG. 4C is a perspective cross-sectional view of a fan aspirator have a plurality of motors and a respective plurality of drive gears, in accordance with various embodiments.

Referring now to FIGS. 4A, 4B, and 4C, details of the fan aspirator are provided. With specific reference to FIG. 4A, the fan aspirator 302 generally includes a housing 320 defining a central channel within which a fan is disposed. The housing 320 generally extends from an inlet end 321 to an outlet end 322, according to various embodiments, and thus the fan aspirator may be referred to herein as a ducted fan aspirator. The housing 320 may extend from the inlet end 321 that is disposed outside 199 of the inflatable device 200 to the outlet end 322 disposed within an internal volume 201 of the inflatable device 200. The fan aspirator 302 may also include an attachment flange 303 that facilitates connecting the fan aspirator 302 to the inflatable device 200. As described in greater detail below, the fan aspirator 302 includes a pinion gear 344 coupled to the fan and at least one motor 340 with a drive gear 342. The motor(s) 340 may drive the drive gear(s) 342, and the drive gears(s) 342 are mechanically coupled to the pinion gear 344 to drive rotation of the fan, thereby inducing airflow from the inlet end 321 to the outlet end 322 to cause the inflatable device 200 to inflate.

The motor(s) may receive electrical energy and convert the electrical energy into mechanical power to drive the fan via the drive gear(s) and the pinion gear. The fan aspirator may further include a fan flap located proximate the fan inlet 321. The fan flap may allow airflow to flow downstream (i.e., from the inlet 321 towards the outlet 322) and may reduce the likelihood of air flowing upstream (i.e., from the outlet 322 to towards the inlet 321).

In various embodiments, and with reference to FIGS. 4B and 4C, the fan 446 may be disposed within the central channel defined by the housing 420. The pinion gear 444, which may comprise an annular body 443, may be mounted to the fan 446 such that the fan 446 and the pinion gear corotate. The rotational axis 403 of the fan 446 may be parallel with (and may be coaxial with) the central longitudinal axis of the housing 420. In various embodiments, the fan aspirator 402 includes a plurality of motors 440 with a respective plurality of drive gears 442. The plurality of motors 440 may be coupled and/or mounted to the housing 420 and may be generally distributed circumferentially around the rotational axis 403 of the fan 446. Each of the drive gears 442 may be mechanically coupled to a gear track of the pinion gear 444, thus collectively driving rotation of the pinion gear 444 and the fan 446 mounted thereto.

In various embodiments, the fan aspirator 402 includes 2 or more motors and respective drive gears. In various embodiments, the fan aspirator includes between 3 and 8 motors and respective drive gears. In various embodiments, the fan aspirator includes 4 motors. In various embodiments, the fan aspirator includes 6 motors. By having a plurality of motors 440 driving the central pinion gear 444 to which the fan 446 is mounted, the fan 446 may be driven to reach speeds sufficient to drive enough air into the inflatable device. Further, various other benefits may be realized by using a plurality of circumferentially distributed motors, such as efficiency, power consumption, and weight savings over conventional aspirators that rely on a source of compressed gas, according to various embodiments.

In various embodiments, and with continued reference to FIG. 4C, the central channel 425 defined by the housing 420 may have a radial dimension that remains constant along a length of the fan aspirator (e.g., at least along a section of the housing 420 at an axial location of the fan blades 448). In various embodiments, the radial dimension of the central channel 425 may vary along the length of the fan aspirator 402. In various embodiments, the fan blades 448 may have a radial span that is less than the radial dimension of the central channel, and thus a radial gap may exist between the outer edge of the fan blades 448 and the radially inward surface of the central channel 425. Thus, as the fan 446 directs air through the central channel 425, additional air (i.e., induced air) may flow through the gap, thus increasing a total airflow through the fan aspirator 402 beyond that provided solely by the fan 446.

In various embodiments, the gear track of the pinion gear 444 is disposed on a radially outward surface of the annular body 443 of the pinion gear 444. Said differently, the pinion gear 444 may have an annular structure, thus allowing the air/fluid to flow through the central aperture of the pinion gear. However, the pinion gear 444 may include one or more structural spokes 445 extending radially between the central region of the pinion gear where it connects to the fan and the annular body 443. With the gear track of the pinion gear 444 disposed on the radially outward surface of the annular body 443, the respective drive gears 442 may be disposed and distributed around the periphery of the pinion gear.

In various embodiments, as mentioned above, the fan aspirator may include a controller electrically coupled to the plurality of motors. The controller may be an electronic speed controller configured to synchronize angular speed of the plurality of motors to efficiently drive rotation of the pinion gear and fan. In various embodiments, a gear ratio of the driven pinion gear relative to the drive gears is between 1.25 and 6. In various embodiments, the gear ratio is between 1.5 and 3. In various embodiments, the gear ratio is about 1.67.

Regarding relative radial dimension of the assembly, a radially inward surface of the annular body 443 of the pinion gear 444 may be radially outward of tips of fan blades 448 of the fan such that a radial gap is defined between the tips of the fan blades 448 and the radially inward surface of the annular body 443. In various embodiments, a radially inward surface of the central channel 425 of the housing 420 (at least at an axial location of the fan blades 448) is radially outward of tips of the fan blades 448 such that a radial gap is defined between the tips of the fan blades 448 and the radially inward surface of the central channel 425 of the housing 420 at this location. In various embodiments, a radially inward surface of the annular body 443 of the pinion gear 444 is radially outward of a radially inward surface of the central channel 425 of the housing 420 at an axial location of the pinion gear 444. By configuring the relative radial dimensions in one or more of these manners, flow stagnation from the pinion gear is inhibited, thus facilitating increased and improved airflow.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan aspirator comprising:
   a housing defining a central channel and having a central longitudinal axis;
   a fan assembly comprising a fan attached to a shaft wherein the fan assembly is disposed in the central channel and configured to rotate about a rotational axis that is substantially parallel to the central longitudinal axis wherein the fan assembly is further configured to direct airflow in a direction of the central longitudinal axis through the central channel;
   a pinion gear coupled to the fan and configured to rotate with the fan about the rotational axis, wherein the pinion gear comprises an annular body comprising a gear track wherein the annular body of the pinion gear extends from the shaft of the fan assembly, radially outward of tips of fan blades of the fan, to the gear track of the annular body of the pinion gear; and
   a motor comprising a drive gear, wherein the motor is coupled to the housing, wherein the drive gear is mechanically coupled to the gear track of the annular body of the pinion gear and wherein the motor is configured to drive the fan via the drive gear and the pinion gear.

2. The fan aspirator of claim 1, wherein the motor is a first motor of a plurality of motors and the drive gear is a first drive gear of a respective plurality of drive gears, wherein the plurality of motors are coupled to the housing and are distributed circumferentially around the rotational axis such that each drive gear of the respective plurality of drive gears is mechanically coupled to the gear track of the annular body of the pinion gear.

3. The fan aspirator of claim 2, wherein the plurality of motors comprises at least 4 motors.

4. The fan aspirator of claim 2, wherein the plurality of motors comprises at least 6 motors.

5. The fan aspirator of claim 2, wherein the gear track is disposed on a radially outward surface of the annular body of the pinion gear such that the respective plurality of drive gears of the plurality of motors are circumferentially distributed around a periphery of the pinion gear.

6. The fan aspirator of claim 5, wherein the pinion gear comprises one or more structural spokes extending radially between a central region of the pinion gear that is coupled to the fan and an outer region of the pinion gear adjacent to the gear track of the pinion gear.

7. The fan aspirator of claim 5, wherein a radially inward surface of the central channel of the housing at an axial location of fan blades of the fan is radially outward of the tips of fan blades of the fan such that a radial gap is defined between the tips of the fan blades and the radially inward surface of the central channel of the housing at an axial location of the fan blades.

8. The fan aspirator of claim 5, wherein a radially inward surface of the annular body of the pinion gear is radially outward of a radially inward surface of the central channel of the housing at an axial location of the pinion gear.

9. The fan aspirator of claim 2, further comprising a controller electrically coupled to the plurality of motors.

10. The fan aspirator of claim 9, wherein the controller is configured to synchronize an angular speed of the plurality of motors.

11. The fan aspirator of claim 2, wherein a gear ratio of the pinion gear relative to one or more drive gears of the fan aspirator is between 1.25 and 6.

12. The fan aspirator of claim 2, wherein a gear ratio of the pinion gear relative to one or more drive gears of the fan aspirator is between 1.5 and 3.

13. The fan aspirator of claim 2, wherein a gear ratio of the pinion gear relative to one or more drive gears of the fan aspirator is at least 1.

14. A fan aspirator comprising:
a housing defining a central channel and having a central longitudinal axis;
a fan assembly comprising a fan configured with a shaft wherein the fan assembly is disposed in the central channel and configured to rotate about a rotational axis that is substantially parallel to the central longitudinal axis wherein the fan assembly is further configured to direct airflow in a direction of the central longitudinal axis through the central channel;
a pinion gear coupled to the fan and configured to rotate with the fan about the rotational axis, wherein the pinion gear comprises an annular body comprising a gear track, wherein the gear track is disposed on a radially outward surface of the annular body of the pinion gear, wherein the annular body of the pinion gear extends from the shaft of the fan assembly, radially outward of tips of fan blades of the fan, to the gear track of the annular body of the pinion gear; and
a plurality of motors comprising a respective plurality of drive gears, wherein the plurality of motors are coupled to the housing and are distributed circumferentially around a rotational axis such that each drive gear of the respective plurality of drive gears is mechanically coupled to the gear track of the annular body of the pinion gear, wherein the plurality of motors are configured to drive the fan via the respective plurality of drive gears and the pinion gear.

15. The fan aspirator of claim 14, wherein:
a radially inward surface of the central channel of the housing at an axial location of the fan blades of the fan is radially outward of the tips of the fan blades; and the pinion gear comprises one or more structural spokes extending radially between a central region of the pinion gear that is coupled to the fan and an outer region of the pinion gear adjacent to the gear track of the pinion gear.

16. A system for inflating an inflatable device, the system comprising:
the inflatable device; and
a fan aspirator coupled to the inflatable device, the fan aspirator comprising:
a housing defining a central channel and having a central longitudinal axis;
a fan assembly comprising a fan coupled to a shaft, wherein the fan assembly is disposed in the central channel and configured to rotate about a rotational axis that is substantially parallel to the central longitudinal axis wherein the fan assembly is further configured to direct airflow in a direction of the central longitudinal axis through the central channel;
a pinion gear coupled to the fan and configured to rotate with the fan, wherein the pinion gear comprises an annular body comprising a gear track wherein the annular body of the pinion gear extends from the shaft of the fan assembly, radially outward of tips of fan blades of the fan, to the gear track of the annular body of the pinion gear; and a plurality of motors comprising a respective plurality of drive gears, wherein the plurality of motors are coupled to the housing and are distributed circumferentially around the rotational axis such that each drive gear of the respective plurality of drive gears are mechanically coupled to the gear track of the annular body of the pinion gear, wherein the plurality of motors are configured to drive the fan via the respective plurality of drive gears and the pinion gear wherein the plurality of motors are coupled to the housing and are distributed circumferentially around the rotational axis such that each drive gear of the respective plurality of drive gears is mechanically coupled to the gear track of the annular body of the pinion gear.

17. The system of claim 16, further comprising an electrical power source electrically coupled to the plurality of motors.

18. The system of claim 17, further comprising a controller electrically coupled to the plurality of motors and configured to synchronize an angular speed of the plurality of motors.

19. The system of claim 16, wherein the plurality of motors comprises at least 4 motors.

20. The system of claim 16, wherein a gear ratio of the pinion gear relative to one or more drive gears of the fan aspirator is between 1.5 and 3.

* * * * *